United States Patent Office 3,465,249
Patented Sept. 2, 1969

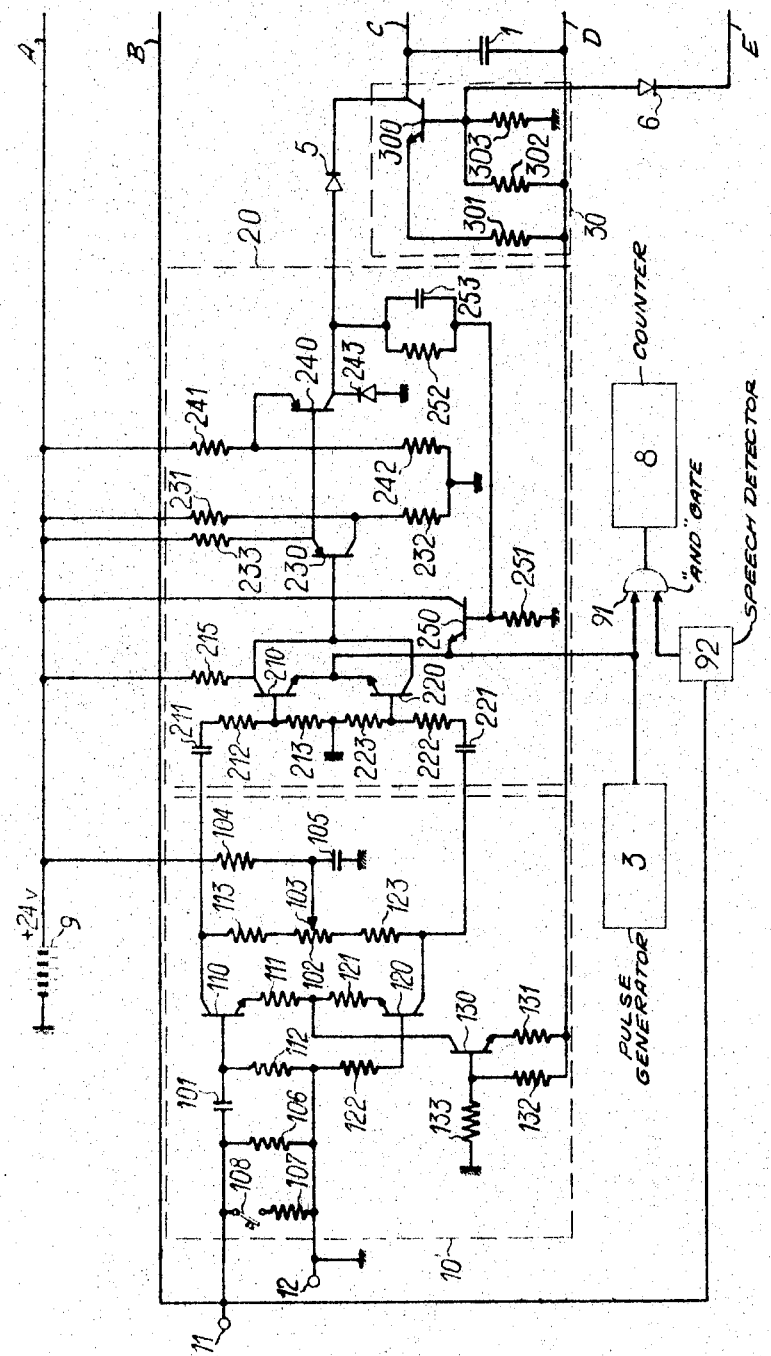

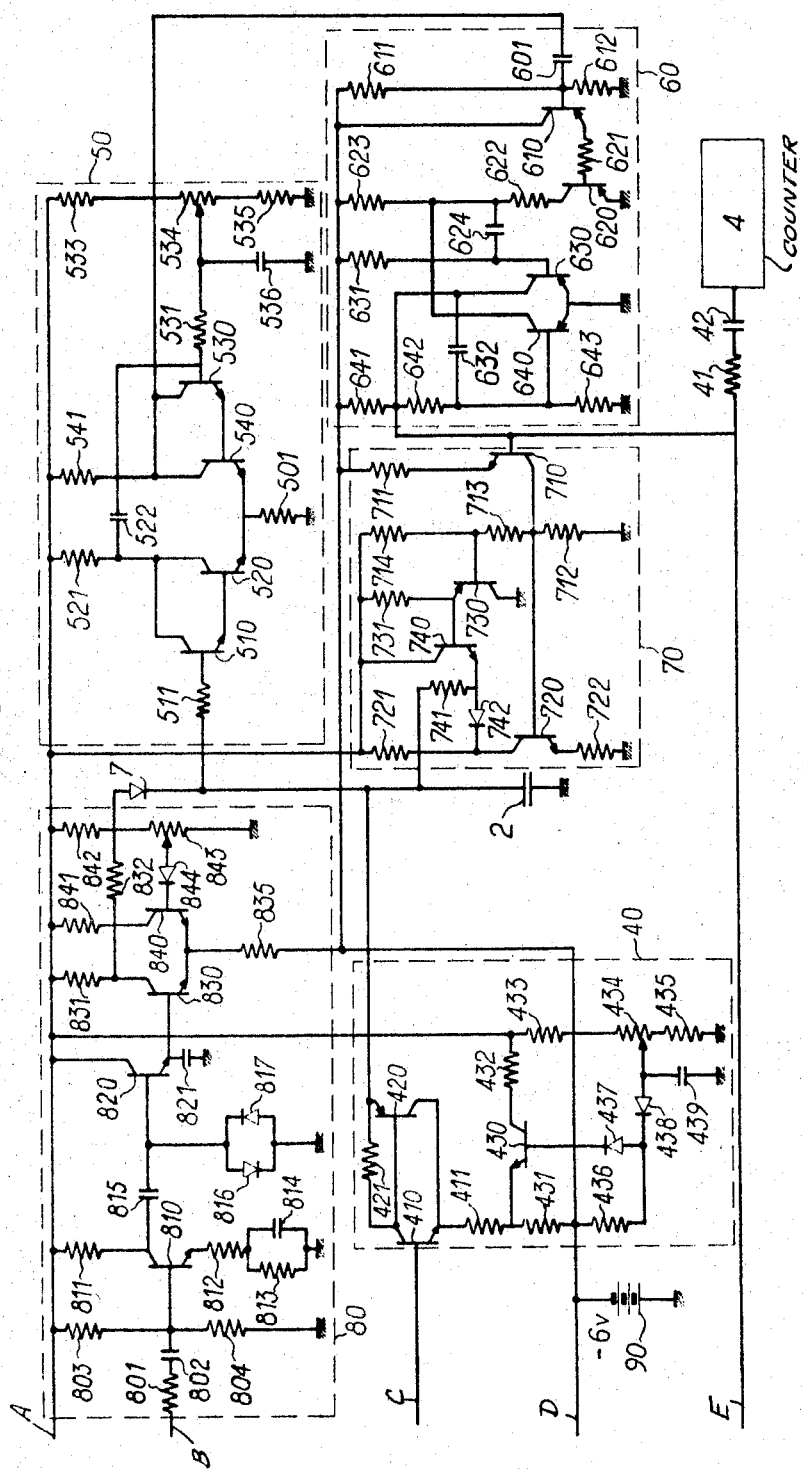

3,465,249
WIDE FREQUENCY BAND SIGNAL CONVERTER
Antoine Marie Jousset, 50 Blvd. Beaumarchais, Paris 11, France; Christian Augustin Jacquart, Rue de Pont Hele 22, Perros-Guirec, France; Yves Henri le Goffic, Pavillon No. 3, Saint-Roch 22, Lannion, France; and Jean Emile Milon, 142 D. Kervoilan 22, Perros-Guirec, France
Filed July 28, 1967, Ser. No. 656,902
Claims priority, application France Aug. 3, 1966, 71,996
Int. Cl. G01r 1/28, 1/30
U.S. Cl. 324—111                         5 Claims

ABSTRACT OF THE DISCLOSURE

A device allowing precise measurement in digital form of the mean power of variable amplitude electrical signals covering a wide frequency band, over a given time interval, without employing high speed counting means; said device comprises means for periodically sampling said signals for their amplitude, means for charging a first capacitor to a voltage proportional to each sampled amplitude, means for completely discharging said first capacitor at constant current rate during each sampling period, a second capacitor, means for partially discharging said second capacitor at a current rate proportional to the voltage across said first capacitor during each discharge period thereof, means for rapidly recharging said second capacitor up to a predetermined maximum voltage as soon as the voltage across its terminals reaches a predetermined minimum value, and means for counting the number of rechargings of said second capacitor over said given time interval.

BACKGROUND OF THE INVENTION

Field of the invention

This invention relates to a wide frequency band device by means of which electrical signals applied to its input can be converted to other electrical signals whose amplitudes are square-law functions of the input signal amplitudes.

Description of the prior art

In the French Patent No. 1,336,313, filed July 18, 1962 by the first-named of the present applicants, there is described a device which allows the measurement in digital form of the mean power of a low frequency modulation signal over an arbitrary span of time. The said low frequency modulation is sampled at a suitable recurrence frequency and a first sawtooth wave generator transforms each sample into a first sawtooth signal whose both amplitude and duration are proportional to the amplitude of the said sample; an integrator furnishes a signal whose amplitude is proportional to the area of the said first sawtooth, and a second sawtooth generator supplies a signal whose duration is proportional to the amplitude of the output signal from the integrator and therefore also proportional to the square of the amplitude of the said sample. The duration of the output signals from the sawtooth generator is measured by means of a digital counter. In a signal converter of this sort, each sample is treated independently, so that it is difficult to obtain high precision in measurement, even when using a very high counting frequency in the determination of the duration of the said output signals.

The object of the present invention is to increase the precision of measurements of the mean power of electrical signals of the above-specified kind.

SUMMARY OF THE INVENTION

A special object of the invention is to enable precision digital measurement, without the need to resort to high speed counter means of the mean power of telephonic modulation signals at the output from a telecommunication equipment, over an arbitrary interval of time.

In accordance with the invention, a signal converter comprises means for periodically sampling a modulation signal, the mean power of which is to be measured, a first capacitor, means for charging said first capacitor up to a voltage proportional to the amplitude of each of the samples obtained through said sampling, means for completely discharging said first capacitor at constant current during the period of time comprised between any two successive samplings, a second capacitor, means for partially discharging said second capacitor at a current proportional to the voltage across the terminals of the said first capacitor during each discharge thereof, means for rapidly recharging said second capacitor up to a predetermined maximum voltage as soon as the voltage across its terminals drops to a predetermined minimum value, means for counting the number of samples taken over a given time period, and means for counting the number of rechargings of said second capacitor during said period. The difference between the said maximum and minimum voltages is proportional to the sum of the squares of the amplitudes of the samples involved in one and the same discharge phase of said second capacitor, the ratio of the said number of rechargings to the number of samples over a given period being proportional to the power of the signals applied to the input terminals of the signal converter.

Another object of the invention is to make it possible to inhibit counting during the measurement period, during the time intervals within which the said equipment supplies no power for example at times such as the periods of silence which may be involved in a telephone conversation.

Another feature of the signal converter in accordance with the invention is that it comprises means for blocking the said counting means which counts the number of samples, when the power applied to its input is virtually zero.

The invention will be better understood from a perusal of the following description and from an examination of the attached drawings in which:

BRIEF DESCRIPTION OF THE DRAWINGS

FIGURES 2a, 2b, arranged side by side, illustrate an embodiment of the signal converter in accordance with FIGURE 1.

DESCRIPTION OF PREFERRED EMBODIMENT

Figure 1:
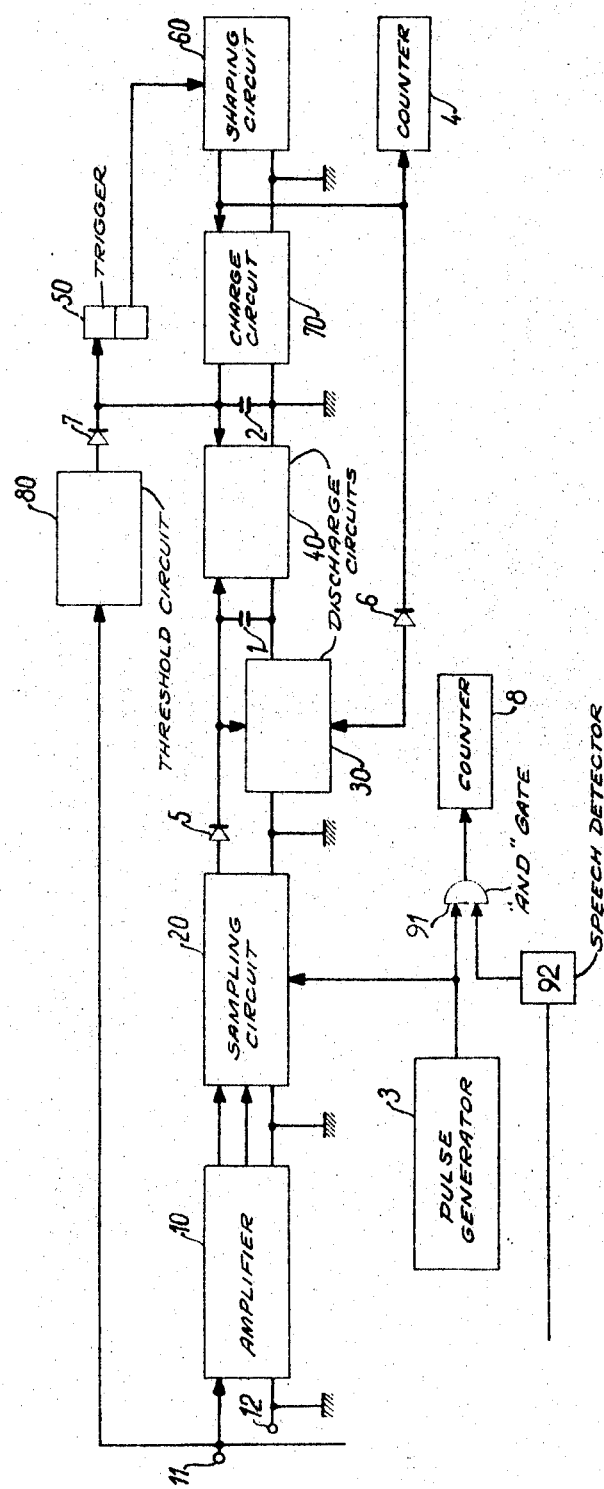
FIGURE 1 is a block diagram of the signal converter in accordance with the invention.

The signal converter illustrated in FIGURE 1 comprises:

An amplifier 10 having an input and two outputs across the input terminals 11, 12 of which the modulated signal whose mean power is going to be measured, is applied, the terminal 12 being grounded;

A sampling circuit 20 which samples the output signals from the amplifier 10 under the control of the pulse generator 3;

A capacitor 1 which is charged by the samples coming from the circuit 20 through the medium of a diode 5, this diode preventing the capacitor from discharging back into the circuit between sampling instants;

A constant current discharge circuit 30 for the capacitor 1;

A capacitor 2 connected across the terminals of the capacitor 1 through a circuit 40 which produces partial discharge of the capacitor 2 during discharge of the capacitor 1, at a current whose instantaneous level is proportional to the instantaneous voltage across the terminals of the capacitor 1;

A trigger 50 which remains in the operative position as a consequence of the charging voltage applied to the capacitor 2, this as long as said voltage is higher than a predetermined minimum value, and flips into the non-operative position as soon as the charge on the capacitor 2 drops to this said minimum value;

A pulse shaping circuit 60 which gives a constant amplitude and a predetermined length, for example 2 microseconds, to the pulse produced on relaxation of the trigger 50 (i.e. produced when the latter goes into the non-operative state);

A charging circuit 70 for the capacitor 2, which operates through a low impedance and throughout the duration of the calibrated pulse from the circuit 60 and supplies a maximum charging voltage of predetermined level to said capacitor with high accuracy;

A threshold circuit 80 which applies to the capacitor 2, through a diode 7, a weak current which compensates for the intentional discharge when the signal applied to the input of the signal converter has zero amplitude or is very weak.

The output of the calibrated circuit 60 is linked on the one hand through the medium of a diode 6 to a control blocking input of the discharge circuit 30 in order to inhibit the discharge of the capacitor 1 for the duration of the calibrated pulse which controls the recharging of the capacitor 2, and on the other hand to the input of a pulse counter 4.

The output of the pulse generator 3 is connected to the input of a pulse counter 8 through the medium of an AND-gate 91 controlled by a speech detector 92, the input of which is connected to the terminal 11.

The ratio between the indications of the counters 4 and 8 is a measure of the mean power furnished across the input resistance of the differential amplifier 10 during the effective time indicated by the counter 8.

FIGURES 2a, 2b, which should be placed side by side, together represent an embodiment of the device illustrated in FIGURE 1. Each one of connections A, B, C, D and E in FIGS. 2a and 2b must be considered as a single and continuous connection designated in both figures by the same reference letter.

The amplifier 10 (FIG. 2a) comprises two n-p-n transistors 110 and 120 which are fed in parallel with constant current, from an n-p-n transistor 130, the collector of which is connected to the emitters of the transistors 110 and 120 through the medium of two identical resistors 111, 121.

The emitter of the transistor 130 is connected to a negative potential source 90 (FIG. 2b), for example —6 volts, through a resistor 131 at its base is connected on the one hand to the source 90 and on the other to ground through the medium of the resistors 132, 133, which may be identical one for example.

The base of the transistor 110 is connected on the one hand to the terminal 11 through the capacitor 101 and on the other to ground through a resistor 112. The base of the transistor 120 is connected to earth through a resistor 122. Collectors of the transistors 110, 120 are connected together through three resistors 113, 102, 123 which are in series, the two outside ones, 113, 123, of which are identical and the middle one, 102, being connected through a slider 103 on the one hand through a resistor 104 to a positive potential source 9, for example +24 volts, and on the other hand through a capacitor 105 to ground. The resistances of the resistors associated with the transistors 110, 120, 130 are such that these devices are permanently conductive and operate in the unsaturated condition.

The terminal 11 is connected to the terminal 12 through two resistors 106, 107 which are in parallel, the latter of which is in series with a contact breaker 108 enabling the input resistance of the amplifier 10 to be set at 600 ohms for example, when the contact breaker 108 is closed, and to 800 ohms for instance, when it is open.

When no voltage is applied across the terminals 11 and 12 of the transistors 110, 120, whose bases are biased at earth potential through the resistors 112, 122 and whose emitters are maintained at the same negative potential through the resistor 131, the transistor 130 and the respective resistors 111, 121 (which are identical), are both conductive and a constant current of for example in the order of 2.5 milliamps passing through the transistor 130 is split equally between them so that there is no potential difference between their collectors, the slider 103 enabling symmetry between the circuits to be adjusted.

When a variable signal is applied across the terminals 11 and 12, it is transmitted by the capacitor 101 to the base of the transistor 110, varying its bias voltage, whilst the bias voltage at the base of the transistor 120 stays constant.

Imbalance is thus produced between the two circuits which link the slider 103 to the collector of the transistor 130, and, although the current flowing through this transistor remains constant, equal and opposite voltage variations develop at the collectors of the transisors 110, 120.

The sampling circuit 20 comprises two n-p-n transistors 210, 220 whose bases are connected respectively to the collectors of the transistors 110, 120 through capacitors 211, 221 in series with resistors 212, 222, and are connected to ground through the resistors 213, 223. The emitters of the transistors 210, 220 are connected in parallel to the output of a pulse generator 3 and their collectors are connected in parallel on the one hand through a resistor 215 of high resistance to the positive D.C. voltage source 9, and on the other hand to the base of a p-n-p transistor 230, arranged in grounded collector fashion, which controls a p-n-p transistor 240. The output of the latter is connected through the diode 5 to one terminal of the capacitor 1 the other terminal of which is connected to the negative source 90 and, through a circuit comprising a resistor 252 and a capacitor 253 in parallel, to the base of an n-p-n transistor 250 having its collector is connected to the positive source, its emitter to the emitters of the transistors 210, 220, and its base grounded through a resistor 251.

The generator 3 produces short constant current pulses of for example, 1 milliamp and lasting say 2 microseconds, the recurrence frequency of which is at least twice the maximum frequency of the modulation signal whose mean energy is going to be measured. For example, in the case where the signals to be sampled are voice-frequency telephone signals, the recurrence frequency will be in the order of 8000 cycles per second and the sampling pulses will thus appear about once every 125 microseconds. These pulses are not transmitted to the counter 8 by the gate 91 except during the time for which the speech detector 92 supplies said gate with an unblocking signal, i.e. when a modulation of significant amplitude is applied across the terminals 11 and 12.

The transistors 210, 220 receive the respective antiphase signals from the transistors 110, 120, and thus constitute an arrangement which is equivalent to a single transistor to which a previously rectified voltage would be applied. The resistance of resistor 215 in their collector circuit being chosen very high, their voltage gain is very high too.

The transistors 230, 240 constitute a linear amplifier for the signals delivered by the transistors 210, 220. The collector of the transistor 230 is connected on the one hand to the positive source 9 through a resistor 231, and on the other hand to ground through a resistor 232; its emitter is connected on the one hand to the positive source 9 through a resistor 233, and on the other hand connected to the base of the transistor 240. The latter has its emitter connected on the one hand to the positive source 9 through a resistor 241 and on the other hand to ground through a resistor 242, its collector being grounded through a diode 243, connected to the capacitor 1 across the diode 5, and connected to the base of the transistor 250 by means of the parallel assembly of the resistor 252 and the capacitor 253. The anode of the diode 243 being grounded and its cathode connected to the collector of the transistor 240, when the latter is blocked the base of the n-p-n transistor 250 has a slightly negative potential and this transistor is therefore blocked.

The discharge circuit 30 of the capacitor 1 is constituted by an n-p-n transistor 300 whose emitter is connected to the negative source 90 through a resistor 301 and its base on the one hand biased through two resistors 302, 303 (one of which is connected to the source 90 and the other grounded) and on the other hand connected to the output of the shaping circuit 60 across a diode 6 through which latter said output of said circuit 60 applies to said transistor 300 a negative blocking pulse during the charging time of the capacitor 2. Blocking of the discharger capacitor 1 during the charging up of the capacitor 2 prevents any systematic error since the next discharging of the capacitor 2 is initiated at a voltage equal to the voltage prevailing across the terminals of the capacitor 1 prior to blocking. The resistances of the resistors 301–303 are calculated so that the constant current across the transistor 300 is high enough, during the time elapsing between two sampling pulses, to ensure discharge of the capacitor 1 when charged up by a maximum amplitude sample. For example, since the time of discharge is limited to about 120 microseconds, a discharge current of 0.16 milliamp means an effective charge on the capactior 1 of +10 volts.

In the absence of any sampling pulses, the transistor 240 is blocked and the constant current across the discharge circuit 30 produces two successive voltage drops, the first through the diode 243 between ground and the collector of the transistor 240, and the second through the diode 5 such that the collector of the transistor 300 is at a slightly negative potential, for example −0.8 volt.

During a sampling pulse, if the amplitude of the signal applied across the terminals 11, 12 is zero, the constant current of about 1 milliamp furnished by the pulse generator 3 is split between the high-resistance circuits constituted on the one hand by the transistors 210, 220 and their collector resistance 215 (which has a high value), and on the other hand by the transistor 250. A slight drop in voltage takes place at the collectors of the transistors 210, 220 as a result of this, and this is transmitted by the transistor 230 to the base of the transistor 240. The latter becomes conductive and the potential of its collector is increased; however, the voltage proportional to this rise in potential, which is applied by the circuit 252, 253 to the base of the transistor 250 is transmitted by the latter to the emitters of the transistors 210, 220. Consequently, the potential of the collector of the transistor 240 cannot exceed the potential prevailing at the base of the transistors 210, 220, i.e. ground potential. The voltage drop due to the presence of the diode 243 thus having been eliminated, the only voltage drop left is that due to the diode 5 and the collector potential of the transistor 300 takes a value of about −0.5 volt. The voltage across the terminals of the capacitor 1, one of whose electrodes is conected to the source 90 at −6 volts, and the other to the collector of the transistor 300, is thus substantially equal to 5.5 volts and in the following this will be considered as corresponding to the state of complete discharge of this capacitor.

When a signal of amplitude other than zero is transmitted by the amplifier 10, whose voltage gain is in the order of 9, to the transistors 210, 220, and this at a time when a sampling pulse is applied to the emitters of the latter transistors, that transistor whose base is rendered positive by this signal becomes conductive. The rapid drop in potential which results from this at the base of the transistor 230 is transmitted by the emitter of this transistor to the base of the transistor 240 which becomes conductive and allows the capacitor 1 to charge up rapidly through the diode 5 until the voltage proportional to the charge on the capacitor, which voltage is applied to the base of the transistor 250, is equal to the higher of the voltages obtaining at the bases of the transistors 210, 220.

The capacitor 253 ensures rapid transmission of the collector voltage of the transistor 240 to the base of the transistor 250 in order to prevent any possibility of the capacitor 1 being charged up to a higher voltage than that corresponding to the signal applied at the input of the sampling circuit 20, taking due account of the voltage gain of this circuit, which may be, for instance in the order of magnitude of 2.5.

The circuit 40 (FIG. 2b) for discharging the capacitor 2 comprises an n-p-n transistor 410 whose base is connected to the capacitor 1, a p-n-p transistor 420, and an n-p-n transistor 430. The collector of the transistor 410 is connected to the base of the transistor 420 and connected through a resistor 421 to the emitter of 420 which is itself connected to the capacitor 2. The emitter of the transistor 410 and the collector of the transistor 420 are connected together and through a resistor 411 to the emitter of the transistor 430, this emitter being itself connected to the negative source 90 across a resistor 431. The input impedance of the circuit constituted by the assembly of the transistors 410, 420 is in the order of 10 megohms so that the base current of the transistor 410 through which the capacitor 1 discharges is negligible. The collector of the transistor 430 is connected by a resistor 432 to the positive source 9 of FIG. 2a (connection A). The circuit for biasing the base of the transistor 430 comprises on the one hand a resistor 436 which links the base of the transistor 430 to the negative source 90 through a diode 437, and on the other hand a potentiometer tapping connected through the diode 438 to the resistor 434 in series with the resistor 435 connected to ground, as well as a resistor 433 connected to the positive source 9, the two diodes 437, 438 being so arranged as to enable to base of the transistor 430 to be positively biased. The common point to the anode of the diode 438 and the resistor 434 is grounded through the capacitor 439. Control of the bias voltage at the base of the transistor 430 is effected so that when the collector voltage of the transistor 300 is equal to −0.8 volt, i.e. when no sampling takes place, the discharge current from the capacitor 2 through the discharge circuit 40 is zero, and so that for zero signal amplitude across the terminals 11 and 12, the sampling pulses produce a very weak discharge current from the capacitor 2 through the circuit 40. This discharge current, which is compensated for by a charging current stemming from the threshold circuit 80, as will be explained hereinafter, is employed to correct the non-linearity of the transistors 410, 420, in the case of very low amplitude input signals. Its level is reduced as a function of the amplitude of the input signals and it is inhibited as soon as the discharge current from the capacitor 2 is proportional to the voltage between the terminals of the capacitor 1.

The variations in voltage drop across the diode 5 and across the base-emitter junction of the transistor 410 as a function of temperature, are compensated for by equal variations in the diodes 437, 438 and in the base-emitter junction of the transistor 430 so that the current through the resistor 411, that is to say the discharge current of the capacitor 2, is independent of the temperature within sufficiently wide limits.

The trigger 50 is a monostable device of high sensitivity comprising two pair of transistors 510, 520 and 530, 540, each one in a Darlington circuit so that the input impedance is very high and the discharge of the capacitor 2 is not affected.

The base of the transistor 510 is connected to the capacitor 2 across a resistor 511 whose emitter is connected to the base of the transistor 520, and the collectors of the transistors 510, 520 are connected together and on the one hand to the positive source 9 via a resistor 521 and on the other to the base of the transistor 530 via a capacitor 522. The base of the transistor 530 is biased across a resistor 531 using a potentiometer tapping established on the middle resistor 534, of a voltage-divider comprising three resistors 533, 534, 535, connected in series between the source 9 and ground. The common point to the resistors 531, and 534 is grounded across a capacitor 536. The emitters of the transistors 520 and 540 are connected together and grounded through a resistor 501.

When the capacitor 1 is charged, the transistors 510, 520 are conductive and the transistors 530, 540 are blocked. During discharge of the capacitor 2, the potential at the common point to the emitters of the transistors 520, 540 follows the voltage variations taking place between the terminals of the capacitor until this voltage drops below that applied to the base of the transistor 530 from the voltage-divider 533, 534, 535, which latter voltage can be regulated for example to give it a value in the order of +12 volts. As will become apparent in the following, the negative signal appearing between the collectors of the transistors 530, 540 when the trigger 50 operates, produces immediate recharging of the capacitor 2. In practice, it is advantageous to control the slider of the resistor 534 so that for a 200 millivolts effective input signal across the input terminals 11, 12 of the device, the number of recharging of the capacitor 2 is in the order of 4000 per second.

The pulse shaping circuit 60 handling the output signals from the trigger 50, comprises a 2-stage amplifier, the stages being constituted respectively by the p-n-p transistor 610, 620 and a monostable trigger consisting of two p-n-p transistors 630, 640.

The base of the transistor 610 is connected to the collectors of the transistors 530, 540 through a capacitor 610, to the negative source 90 through a resistor 611 and earthed across a resistor 612. Its emitter is connected to the base of the transistor 620 through a transistor 621 and its collector is connected to the source 90. The emitter of the transistor 620 is grounded and its collector is connected through a resistor 622 on the one hand to the source 90 via a resistor 623 and on the other hand to the base of the transistor 630 via a capacitor 624. The transistor 610 is biased to the conduction threshold in order that it only becomes conductive if it receives a negative signal from the trigger 50.

The base of the transistor 630 is biased to the voltage of the source 90 through a resistor 631. The emitters of the transistors 630, 640 are both directly grounded. The collector of the transistor 630 is connected to the base of the transistor 640 through a capacitor 632 and to the source 90 through the resistor 641 and at the same time grounded through the assembly of two series connected resistors 642, 643. The base of the transistor 640 is connected to the common point to the resistors 642, 643, and its collector is connected to the junction of the resistors 622, 623. The collector of the transistor 630, which constitutes the output terminal of the shaping circuit 60, is connected to the input of the counter 4 through the resistor 41 and a capacitor 42 connected in series therewith, to the blocking input of the discharge circuit 30 of the capacitor 1 through the diode 6, and to the control input of the recharging circuit 70 for the capacitor 2.

The transistor 610 is biased so that it only conducts during the application of the negative pulses coming from the trigger 50. A positive polarity pulse then appears on the collector of the transistor 620 and triggers the monostable device constituted by the transistors 630 and 640, the former of which produces at its collector a calibrated negative pulse having an amplitude of —5 volts and a duration of 2 microseconds, for example..

The recharging circuit 70 for the capacitor 2 comprises three n-p-n transistors 710, 720, 740 and a p-n-p transistor 730. The base of the transistor 710 is connected to the collector of the transistor 630, its emitter is connected to the negative source 90 through a resistor 711 and its collector is connected to the base of the transistor 720, and also grounded through a resistor 712 and connected to the positive source 9 (connection A and FIG. 2a); through two series-connected resistors 713, 714, the common point to which is connected to the base of the transistor 730. The collector of the latter is grounded and its emitter is connected to the base of the transistor 740 and to the source 9 (FIG. 2a via connection A) through a resistor 731. The transistor 740 has its collector connected to the source 9 and its emitter connected on the one hand through a low resistance resistor 741 to the capacitor 2 and on the other hand to the collector of the transistors 720 through a diode 742. The transistor 720 has its collector also connected to the source 9 through a resistor 721 and its emitter earthed through a resistor 722.

In the absence of any output signal from the shaping circuit 60, the transistor 710, whose emitter is negatively biased and whose base is at ground potential through the transistor 630 (which is saturated), is itself saturated so that its collector applies a negative potential to block the base to the transistor 720 whose emitter is biased to ground potential. With the transistor 720 thus blocked, its collector is at the potential of the source 9, for example 24 volts. The resistors 713, 714, have resistances such that when the transistor 710 is saturated the base potential of the transistor 730, whose emitter is biased to +24 volts, is in the order of 10.5 volts, and that the voltage applied by its emitter to the base of the transistor 740 is in the order of 11 volts. The minimum charging voltage of the capacitor 2, which will trigger the trigger 50 is 12 volts and the emitter of the transistor 740 is at all times biased to a potential higher than that at its base so that this transistor is blocked, meaning that the diode 742 is also blocked.

When the capacitor 2 has reached its minimum charging voltage, the trigger 50 sets the shaping circuit 60 into operation and the negative pulse applied by the collector of the transistor 630 to the base of the transistor 710 blocks the latter so that the diode 742 is also blocked.

When the capacitor 2 has reached its minimum charging voltage, the trigger 50 sets the shaping circuit 60 into operation and the negative pulse applied by the collector of the transistor 630 to the base of the transistor 710 blocks the latter so that the base potentials of transistors 720 and 730 are determined by the voltage-divider incorporating resistors 712, 713, 714. The transistor 720 is driven conductive and the potential applied to the base of the transistor 730 is equal to the maximum charging voltage selected for the capacitor 2, for example 14.5 volts. The voltage drops across the emitter-base path of the transistor 730 and the base-emitter path of the transistor 740 compensate one another as well as their temperature variations mutually do and the capacitor 2 recharges to this potential through the resistor 740 and the low resistance resistor 741 in a shorter time than the duration of the pulse produced by the shaping circuit 60. The emitter resistor 722 of the transistor 720 has a sufficiently high resistance in relation to that of the resistor 741 to ensure that the circuit constituted by the diode 742 and the transistor 720 does not affect the charging of the capacitor 2.

The threshold circuit 80 is constituted by an amplifier stage comprising an n-p-n transistor 810, a clipper and timing stage comprising an n-p-n transistor 820 and a capacitor 821, and a differential amplifier comprising two n-p-n transistors 830, 840.

The base of the transistor 810 is connected to the input terminal 11 (connection B and FIG. 2a) through a resistor 801 in series with the capacitor 802 and is biased through a voltage-divider comprising two resistors 803, 804 which connect it respectively to the positive source 9 and to ground. The emitter of the transistor 810 is grounded through a resistor 812 in series with a resistor 813 in parallel connection with a capacitor 814, and its collector is connected through a capacitor 815 to the base of the transistor 820 itself grounded through a clipper circuit constituted by two diodes 816, 817 connected in parallel with opposite conduction directions. The collector of the transistor 820 is connected to the positive source 9 and its emitter is grounded through the capacitor 821 and also connected to the base of the transistor 830. The latter has its collector connected on the one hand to the source 9 through a resistor 831, and on the other hand through a resistor 842 to a diode 7, and has its emitter connected to the emitter of the transistor 840 and through a resistor 835 to the negative source 90. The transistor 840 has its collector connected to the source through a resistor 841 and its base is biased by a voltage-divider employing two resistors 842, 843 connected in series between the source 9 and ground, using a slider on the resistor 843 and using a diode 844. The latter, the cathode of which is connected to the base of the transistor 840, is provided for compensating for the voltage drop between base and emitter of the transistor 820 as well as for the variations in this voltage drop as a function of temperature. The slider on the resistor 843 is arranged thereon in such a position that in the absence of any signal across the input terminals 11 and 12, the transistor 830 is blocked and the constant current flowing through the resistor 835 passes exclusively through the transistor 840. A very weak charging current from the source 9 and flowing through the resistor 831, the resistor 832 (having very high resistance, for example 70 megohms) and the diode 7, thus compensates for the discharge current of the capacitor 2 which is chosen at will by adjustment of the potentiometer 434.

When a signal is applied across the input terminals 11 and 12, it is amplified by the transistor 810 and then clipped by the diodes 816, 817, unblocking the transistor 820 through which the capacitor 821 rapidly charges up. The charging voltage of the capacitor 821, applied to the base of the transistor 830, unblocks the latter so that the collector voltage reduces the charging current of the capacitor 2. When the input signal reaches 4 to 5 millivolts, the collector potential of the transistor 830 drops below the minimum charging voltage of the capacitor 2, the diode 7 is biased in the reverse direction and charging current ceases to flow to the capacitor 2.

When the amplitude of the input signal suddenly drops from a high level to zero, the transistor 820 ceases to be conductive but the charge on the capacitor 821, which is at its maximum voltage, cannot escape except through the very high impedance presented by the transistor 830 so that several tenths of seconds elapse before the latter becomes conductive and its collector reaches a potential sufficient to reestablish charging current to the capacitor 2.

A satisfactory method of regulating an apparatus of the kind described hereinbefore, is as follows:

An alternating sinusoidal voltage of 20 millivolts effective and frequency 1000 cycles per second for example, is applied across the terminals 11, 12 and the potentiometer 434 of the circuit 40 which discharges the capacitor 2, is set so that the counter 4 indicates 40 pulses per second. The input signal is then set to 200 millivolts effective and the potentiometer 534 of the trigger 50 is set so that the counter 4 indicates 4000 pulses per second; then, these two operations are repeated several times, each time correcting the settings of the potentiometers 434 and 534.

Once the settings have been completed, the limiting working voltage of the apparatus, prior to the clipping, is in the order of 320 millivolts effective; the counter 4 then indicates:

$$4000 \left(\frac{320}{200}\right)^2 = 10,240 \text{ pulses per second}$$

and for a voltage of 6 millivolts effective:

$$40 \left(\frac{6}{20}\right)^2 = 3.6 \text{ pulses per second}$$

In this last case, it is necessary for the measuring time interval to extend over a time greater than 5.5 seconds in order that the counter 4 shall indicate at least 20 pulses, so that a maximum counting error of 1 pulse, does not produce a relative error higher than 5%.

The accuracy of the results obtained in these conditions is:

±1% between 20 and 250 millivolts effective, and
±5% between 6 and 320 millivolts effective, for temperature variations of ±5° C. or ±5% between 10 and 320 millivolts effective, and ±15% between 6 and 320 millivolts effective for temperature variations of ±20° C.

These figures hold within about ±1% throughout the band of frequencies from 30 to 3400 cycles per second in the case of telephonic signals and for the frequency band between 30 and 30,000 cycles per second in the case of sinusoidal signals, except where the frequency is identical with the sampling frequency, or with half the sampling frequency or with some multiple of the sampling frequency.

What is claimed is:

1. A digital power measuring device for a wide frequency band modulation signal, comprising means for taking amplitude samples of said modulation signal at periodically recurring instants, a first capacitor, means for charging said first capacitor to a voltage proportional to the amplitude of each of said samples, means for completely discharging said first capacitor at a constant current over the period of time separating two consecutive samplings, a second capacitor, means for partially discharging said second capacitor by a current proportional to the voltage across the terminals of said first capacitor during each discharge period thereof, means for rapidly recharging said second capacitor up to a predetermined terminals reaches a predetermined minimum value, first counting means for counting the number of samples taken over a given time interval and second counting means for counting the number of rechargings of said second capacitor over said given time interval, whereby the ratio of said number of dischargings to said number of samples indicates the values of said power.

2. A device as claimed in claim 1, comprising means for interrupting the discharge of said first capacitor during the time of recharging of said second capacitor, whereby the discharge of said second capacitor begins with a current proportional to the voltage across the terminals of said first capacitor at the time of the interruption of the discharging of said second capacitor.

3. A device as claimed in claim 1, in which said discharging means for said second capacitor are constituted by a transistor circuit comprising means for maintaining additional discharge of said second capacitor at a current rate sufficient to compensate for the non-linearity of the transistor voltage-current characteristcs when modulated signals of very low amplitude are applied to the input of said device, said device comprising means for supplying said second capacitor with a compensating charging current for said additional discharge current, the intensity of said compensating current diminishing in such a fashion that it reaches zero when the amplitude of said input signals increases above a predetermined level.

4. A device as claimed in claim 3, in which said compensating current supply means comprise a delay circuit.

5. A device as claimed in claim 1, comprising means for blocking said counting means for counting the number of samples taken during said given time interval when the power applied to the input of said device is substantially zero.

References Cited

UNITED STATES PATENTS

| 3,064,193 | 11/1962 | Grubb et al. | 324—120 |
| 3,267,458 | 8/1966 | Anderson et al. | 340—347 |
| 3,188,455 | 6/1965 | Quick | 324—99 XR |

RUDOLPH V. ROLINEC, Primary Examiner

ERNEST F. KARLSEN, Assistant Examiner

U.S. Cl. X.R.

324—140, 120; 340—347